United States Patent [19]
Shone et al.

[11] Patent Number: 6,160,362
[45] Date of Patent: Dec. 12, 2000

[54] IGNITION SCHEME FOR A HIGH INTENSITY DISCHARGE LAMP

[75] Inventors: Michael Shone, Yorktown Heights, N.Y.; Phuong Huynh, McLean, Va.

[73] Assignee: Philips Electronics North America Corporation, New York, N.Y.

[21] Appl. No.: 09/004,019

[22] Filed: Jan. 7, 1998

[51] Int. Cl.$^7$ .................................................. H05B 37/02
[52] U.S. Cl. .................... 315/308; 315/244; 315/209 R; 315/DIG. 7; 315/307
[58] Field of Search ................................ 315/209 R, 219, 315/308, 307, 244, DIG. 7, 291, 224, DIG. 5

[56] References Cited

U.S. PATENT DOCUMENTS

| | | | |
|---|---|---|---|
| 4,053,813 | 10/1977 | Kornrumpf | 315/209 R |
| 5,083,065 | 1/1992 | Sakata | 315/307 |
| 5,677,602 | 10/1997 | Paul et al. | 315/224 |
| 5,751,120 | 5/1998 | Zeitler | 315/225 |

*Primary Examiner*—Michael B Shingleton
*Attorney, Agent, or Firm*—Bernard Franzblau

[57] ABSTRACT

An electronic ballast for reducing blackening of a high intensity discharge lamp, reducing stress on both the lamp and ballast components caused by excessive voltage and current flow and increasing the lamp's effective life. These advantages are achieved through a ballast controller which readjusts the operating frequency of the lamp during each of the three phases of lamp start-up to limit lamp voltage to a predetermined level.

21 Claims, 3 Drawing Sheets

IGNITION SCHEME FOR A HIGH INTENSITY DISCHARGE LAMP

BACKGROUND OF THE INVENTION

This invention relates generally to a ballast for ignition of a high intensity discharge lamp, and more particularly to a scheme for controlling the voltage and/or current applied to the lamp during the initial, non steady state operating modes.

In starting a high intensity discharge (HID) lamp, the lamp experiences three phases. These phases include breakdown, glow discharge, and thermionic arc. Breakdown requires a high voltage to be applied to the electrode. Following breakdown, the voltage must be high enough to sustain a glow discharge and heat the electrode to thermionic emission. Once thermionic emission commences, current must be maintained, in the run-up phase, until the electrode reaches its steady-state temperature. After achieving the arc state, the lamp can be operated with a lower level of current in the steady state operating mode.

The overall life and efficiency of a lamp are affected by this starting sequence as are the values and tolerances of the components required to effect this starting sequence. For ignition, in the pre-breakdown period, the lamp electrode must be brought to a high voltage for a specified duration. Conventional lamps are characterized by a minimum voltage level and time duration in achieving breakdown. Typical minimums range from about 2 to 3 KV for voltage and about 10–100 ms for time duration.

The high voltage requirements for breakdown can be achieved through pulse resonant circuits. The frequency at which the circuit achieves resonance and the resultant resonant voltage varies from circuit to circuit due to variation in component tolerances. Such variation results in the pulse resonant circuit being designed to withstand nominal pulse voltages of about 4 to 5 KV, that is, in the circuit being designed to withstand voltages which are well beyond the 2 to 3 KV range required to start the lamp. An undesirable increase in cost for the pulse resonant circuit can result, Upon achieving breakdown, the lamp enters the non-thermionic glow state. In this phase, the voltage must be sufficiently high to maintain the flow of electrons. Electrons are produced by positive ion bombardment of the cathode which produces secondary electron emission. When the kinetic energy of the positive ions, determined by the cathode fall, is high enough, sputtering of the electrode occurs. Sputtering of the electrode produces volatile species of, for example, tungsten which condense on and blacken the inner surface of the lamp. As the interior of the lamp blackens, transmission of light through the envelope decreases reducing the visible light level. The pieces of tungsten which are deposited on the wall absorb radiation thereby heating the lamp wall above its optimum temperature. A reduction in lamp life can result.

A proper balance must be maintained between minimizing the glow state duration and electric field magnitude to maximize both lamp efficacy and lamp life. This balance is difficult to achieve since a decrease in the amount of energy supplied to the electrode will prolong the glow state duration while an increase in the amount of energy supplied to the electrode will shorten lamp life through an increase in sputtering.

As compared to the non-thermionic glow phase, during the thermionic arc phase, the lamp voltage is reduced and lamp current is increased. During the thermionic arc phase, residual sputtering can still occur. After applying a sufficiently high current to heat the electrode during the thermionic arc phase, the current is reduced and thereafter the lamp is operated under steady state conditions.

Accordingly, it is desirable to provide an improved HID ballast in which the variation in component tolerances can be decreased. The ballast should also provide a proper balance between minimizing the glow state duration and electric field magnitude to maximize both lamp efficacy and lamp life.

SUMMARY OF THE INVENTION

Generally speaking, in accordance with a first aspect of the invention, an electronic ballast for starting a high intensity discharge lamp having breakdown, non-thermionic glow and thermionic arc phases prior to entering a steady state operating mode includes a resonant ignitor, an exciter and a controller. The resonant ignitor applies a lamp voltage across the lamp. The exciter is responsive to a varying control signal for exciting the resonant ignitor at a varying operating frequency. The controller produces the varying control signal based on the phase of the lamp. Prior to breakdown, the controller adjusts the control signal so as to decrease the operating frequency so as to sweep toward a lamp voltage equal to a predetermined ignition voltage. Upon entering the glow phase, the control signal is further adjusted so as to minimize the time duration within the glow phase. Upon entering the thermionic arc phase, the controller further adjusts the control signal so as to increase lamp current.

The controller by adjusting the control signal so as to decrease the operating frequency in sweeping toward a lamp voltage equal to a predetermined ignition voltage can limit the maximum starting voltage so that ballast components need not be designed to withstand voltages as high as 4 to 5 KV. The control signal also can be adjusted so as to provide a proper balance between minimizing the glow state duration and electric field magnitude to maximize both lamp efficacy and lamp life. In the non-thermionic glow phase, the frequency is adjusted so as to reduce the voltage to a level which is known to produce minimal blackening of the lamp surface while being sufficiently high to support continued non-thermionic emission. Of particular importance, the controller during the thermionic arc (i.e.run-up) phase further adjusts the frequency so as to increase the current, at a reduced voltage, so as to support the onset of thermionic emission, yet continue to minimize lamp blackening. Thereafter, the frequency is adjusted by the controller so as to reduce the current and increase the voltage to the steady state conditions for the lamp.

In a feature of the invention, the controller maintains the control signal at a preset operating frequency for a prefixed period of time during which the lamp voltage is held at the predetermined ignition voltage. By applying the predetermined voltage for, at most, a prefixed period of time, the stress on all components is reduced thereby extending their lives. In another feature of the invention, the controller can maintain the control signal at a preset operating frequency for a prefixed period of time during the non-thermionic glow phase. In yet another feature of the invention, the controller can maintain the control signal at a preset operating frequency for a prefixed period of time during the thermionic arc phase.

In accordance with a second aspect of the invention, a method is provided for starting a high intensity discharge lamp having breakdown, non-thermionic glow and thermionic arc phases prior to entering a steady state operating mode by a ballast which includes a resonant ignitor for applying a lamp voltage across the lamp, an exciter, responsive to a varying control signal, for exciting the resonant ignitor at a varying operating frequency, and a controller for producing the varying control signal based on the phase of the lamp. The method includes the steps of decreasing the operating frequency of the exciter so as to sweep toward a lamp voltage equal to a predetermined ignition voltage; adjusting the control signal following breakdown so as to minimize the duration of the glow phase time; and further adjusting the control signal upon entering the thermionic arc phase so as to increase lamp current.

It is a feature of this second aspect to maintain the control signal at a preset operating frequency for a prefixed period of time during which the lamp voltage is held at the predetermined ignition voltage. In another feature of this second aspect, the method further includes maintaining the control signal at a preset operating frequency for a prefixed period of time during the non-thermionic glow phase and/or maintaining the control signal at a preset operating frequency for a prefixed period of time during the thermionic arc phase. In yet another feature of this second aspect, the method further includes lowering the operating frequency of the exciter when in the thermionic arc phase relative to the non-thermionic glow phase.

Accordingly, it is an object of the invention to provide an improved HID ballast which improves lamp life and minimizes lamp blackening.

It is a further object of this invention to provide an improved HID ballast which reduces the cost and complexity of the components required to effect turn on of the lamp and to avoid the premature failure of these components.

Still other objects and advantages of the invention, will, in part, be obvious and will, in part, be apparent from the specification.

The invention accordingly comprises several steps in a relation of one or more of such steps with respect to each of the others, and the device embodying features of construction, a combination of elements and arrangement of parts which are adapted to effect such steps, all is exemplified in the following detailed disclosure and the scope of the invention will be indicated in the claims.

BRIEF DESCRIPTION OF THE DRAWINGS

FIGS. 2a, 2b and 2c illustrate the transfer characteristics of a resonant ignitor during each phase of lamp turn on.

DETAILED DESCRIPTION OF THE PREFERRED EMBODIMENTS

Figure 1:
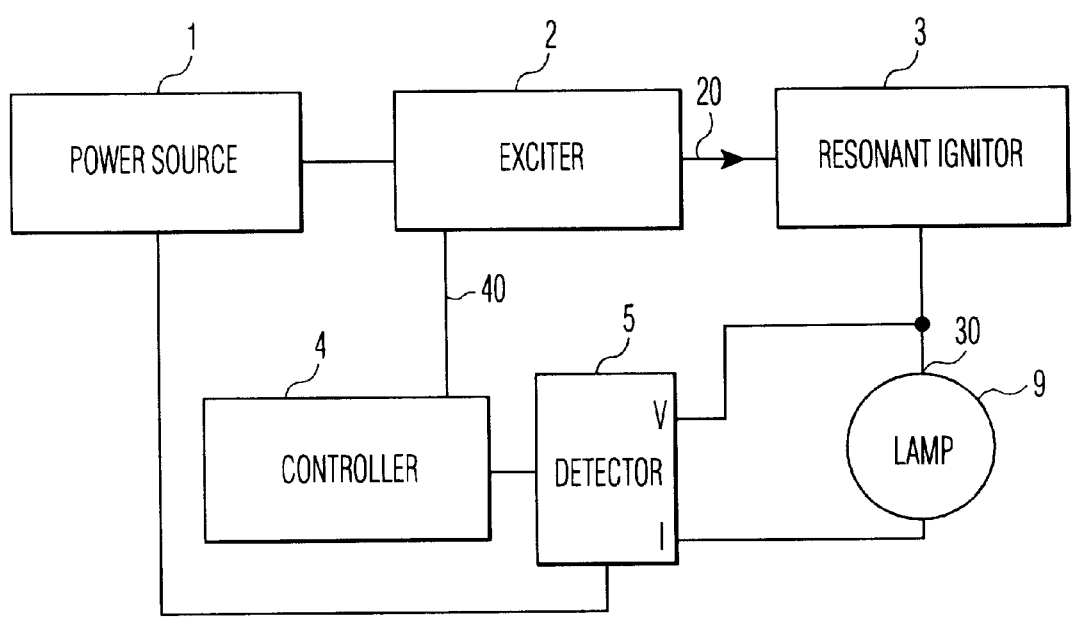
FIG. 1 is a block diagram of an HID electronic ballast in accordance with the invention.

FIG. 1 shows a block diagram of a preferred embodiment of a high frequency electronic ballast for a high intensity discharge (HID) lamp. Lamp 9 is ignited by a resonant ignitor 3, which receives its excitation voltage and current from an exciter (e.g. a bridge circuit) 2. Exciter 2 is triggered by a control signal 40 which controls the generation of a high current signal 20 which excites resonant ignitor 3. The frequency of signal 20 and a resultant voltage 30 applied to lamp 9 is determined by control signal 40. High current signal 20 is in the form of a pulse train. Both exciter 2 and a detector 5 are powered by a power source 1. Control signal 40 is supplied by a controller (e.g. a microcontroller) 4. Frequency of operation by the exciter 2 is determined by control signal 40.

Figure 2A:
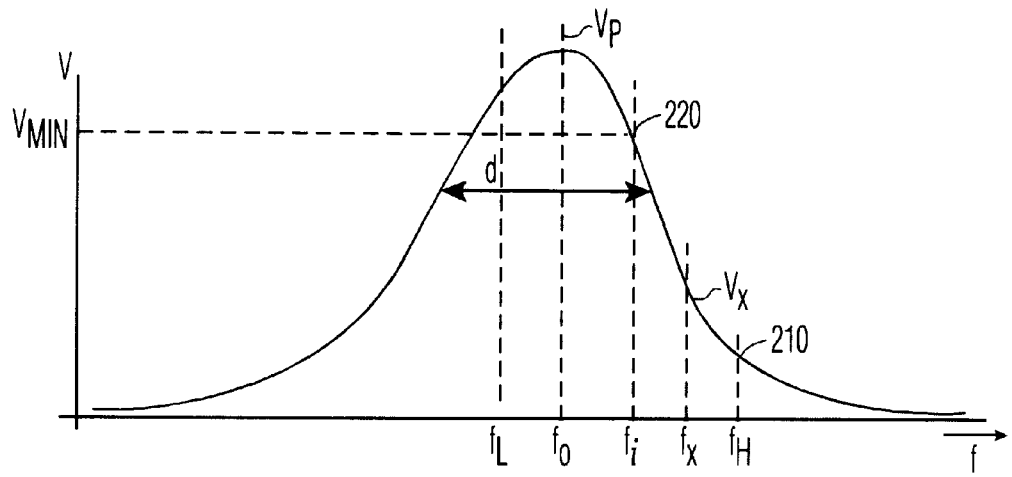

FIG. 2a shows the transfer characteristics of resonant ignitor 3 in combination with lamp 9 prior to lamp breakdown. Lamp 9, in the non-conducting state, is effectively an open circuit, and resonant ignitor 3 has the transfer characteristics of a conventional resonant circuit. At a resonant frequency $f_O$, the voltage will be at a peak voltage Vp. Also shown in FIG. 2a is a voltage $V_{MIN}$ which represents the minimum specified voltage required to drive a lamp of a given type into breakdown provided that the voltage is applied for a minimum specified time duration (not shown).

Ideally, resonant ignitor 3 is designed so that voltage $V_P$ is equal to voltage $V_{MIN}$, that is, so that control signal 40 excites resonant ignitor 3 at exactly resonant frequency $f_O$ whereby only the required minimum voltage $V_{MIN}$ is applied. The value of the particular components within ignitor 3 will determine the particular value of frequency $f_O$, as well as a width d of a waveform about resonant frequency fo and the magnitude of peak voltage $V_P$.

As shown in FIG. 2a, exciting the circuit of resonant ignitor 3 at a frequency of $f_X$ produces a voltage $V_X$. If the specific values of frequency $f_O$ and width d are such that voltage $V_X$ is below voltage $V_{MIN}$, as shown in FIG. 2a, the lamp may not ignite. Conventional resonant ignitors are designed to assure that regardless of the variations in component values, frequency $f_O$ is relatively constrained, and voltage $V_P$ is sufficiently large so as to include a wide range of excitation frequencies at which voltage Vx can be at least equal to voltage $V_{MIN}$. Constraining the frequency $f_O$ requires components with tight tolerances which increases the cost of the components. The peak voltage $V_P$ of the conventional resonant ignitor is designed to be at least about one and one half to three times the required minimum voltage $V_{MIN}$ to compensate for the deviation in breakdown characteristics among different lamps. Conventional ignitors are designed to operate at the peak voltage $V_P$ for the specified minimum time duration in the event of excitation at about the resonant frequency fo. That is, the conventional resonant ignitor is designed to operate at twice the required voltage, introducing additional costs, as well as reduced component life.

In accordance with this invention, however, resonant ignitor 3 is operated at the minimum required voltage level $V_{MIN}$ thereby avoiding the aforementioned additional costs and additional component stress. Controller 4 controls control signal 40 so as to initially excite the resonant ignitor at a frequency $f_H$ well above the nominal resonant frequency. Controller 4 thereafter reduces the excitation frequency while monitoring through a detector 5 the voltage across lamp 9. By reducing the frequency toward the nominal resonant frequency, the voltage across lamp 9 will increase. When the measured voltage across lamp reaches $V_{MIN}$, at frequency $f_i$, controller 4 ceases reduction in frequency and continues to excite the lamp at this frequency for the specified minimum duration.

Voltage $V_{MIN}$ and the minimum duration are the specified values at which all lamps of a given type are assured to ignite; some lamps will ignite at lower voltages and at shorter durations. Detector circuit 5 detects the flow of current through lamp 9. When lamp 9 ignites, current flows through lamp 9. Detector circuit 5 provides a current detected signal supplied to controller 4 once current begins to flow through lamp 9. In response to this signal, controller 4 effects the non-thermionic glow phase. Ignitor 3 operates at a frequency which produces voltage $V_{MIN}$ until lamp current flows or until the minimum non-thermionic time duration elapses, whichever occurs sooner.

When lamp 9 does not enter breakdown there is no lamp current. The minimum time duration for breakdown will elapse. To minimize thermal stress, controller 4 pauses for a few moments to allow the components in the ballast to cool; thereafter, repeats the above process, starting with an excitation frequency of $f_H$. When the frequency is swept down to $f_L$ (i.e. below the resonant frequency fo) before the resonant circuit produces the required minimum voltage $V_{MIN}$, controller 4 ceases the frequency sweep and restarts the above process. Typically, when voltage $V_{MIN}$ has not been achieved, there is no need to pause to allow the components to cool.

Figure 2B:
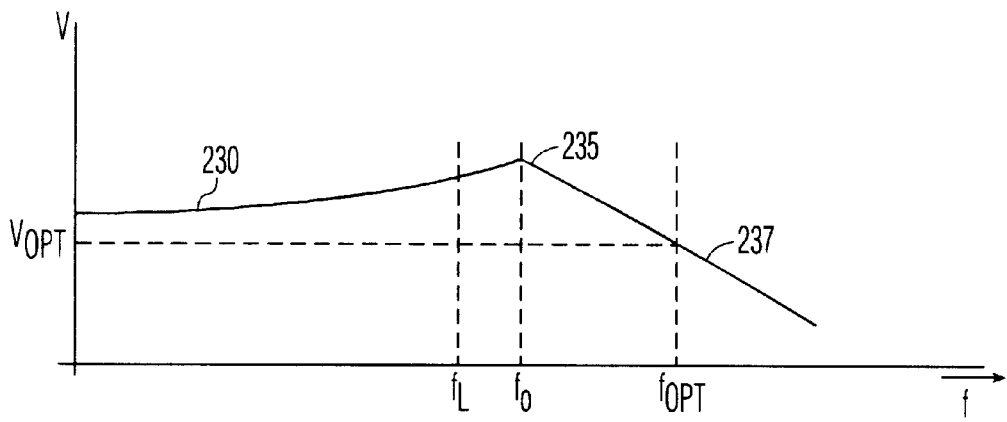

The above process is continually repeated until the flow of lamp current is detected, at which point the ballast enters the non-thermionic glow phase. At breakdown, the impedance of lamp 9 changes from a virtual open circuit to a conductor of lamp current, thereby loading resonant ignitor 3. The transfer function associated with the glow phase is shown in FIG. 2b. The transfer function includes a relatively flat section 230 at low frequencies with a peak 235 about frequency $f_O$ and thereafter falls off at a sloping section 237 for frequencies above frequency fo.

Parts of the electrode are sprayed or sputtered during the glow phase. The loss of material from the electrode will eventually lead to electrode failure, and the lost material adheres to the inner surface of the lamp, causing a blackening which decreases the amount of light emitted from the lamp. By design, or via life testing, an optimal glow phase voltage can be determined so as to maximize the effective life of the electrode and minimize the blackening of the lamp. In accordance with this invention, the frequency of operation will be adjusted so as to provide this optimal voltage to the lamp during the glow phase.

Depending upon the particular characteristics of the lamp, the optimal voltage can be achieved in a variety of ways. If there is very little variability in the transfer function for a given lamp type, specific frequency $f_{OPT}$ associated with the optimal voltage $V_{OPT}$ can be predefined in controller 4. Upon entering the glow phase, controller 4 will adjust control signal 40 so as to have resonant ignitor 3 produce optimal frequency $f_{OPT}$. When there is significant variability in the transfer function of lamps of the same type, an iterative approach can be employed wherein controller 4 sets the operating frequency to the nominal $f_{OPT}$, as discussed above. Thereafter, detector 5 compares the lamp voltage to voltage $V_{OPT}$ and adjusts the excitation frequency to achieve voltage $V_{OPT}$. As shown in FIG. 2b, frequency $f_{OPT}$ is in the sloping section (falloff) 237 of the curve. When the measured voltage is below voltage $V_{OPT}$, the frequency of operation is reduced. When the measured voltage is above $V_{OPT}$, the frequency of operation is increased. As in the breakdown phase, a lower frequency limit $f_L$ is set, beyond which the frequency is not adjusted.

The voltage is maintained at the optimal level throughout the glow phase. In accordance with the invention, when design or life tests indicate that the optimal voltage should be increased or decreased during the glow period, controller 4 is programmed to effect the tracking to this changing optimal level. In a first embodiment, the voltage is maintained at the optimal glow phase voltage for a predetermined time period (e.g. about one half second). In an alternative embodiment, in response to an increase in lamp current sensed by detector 5 when entering the thermionic arc phase, controller 4 readjusts the frequency of exciter 2 operation. During the glow phase as well as all subsequent phases, lamp current is continually monitored. When lamp current ceases, the entire process is repeated starting with the breakdown phase.

Figure 2C:
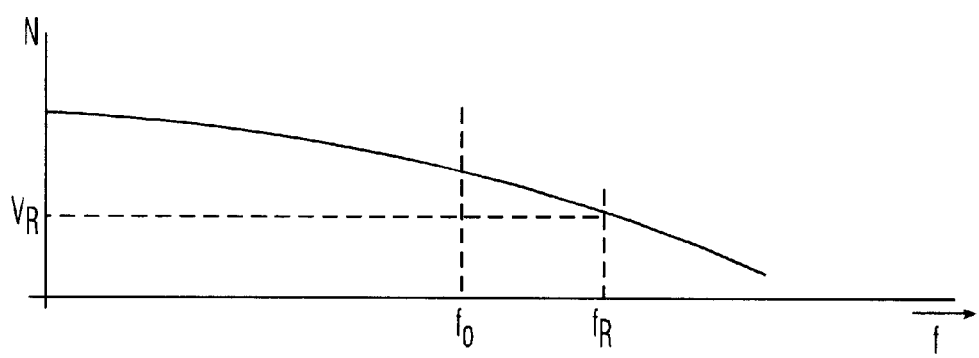

When thermionic emissions begin, at the start of the thermionic arc phase, lamp current increases and lamp voltage significantly decreases. Again, by design or life tests, an optimal run-up current $I_{OPT}$ can be determined such that lamp 9 is brought to full thermionic emission as quickly as possible without causing excessive electrode degradation and blackening. In one embodiment, a run-up current of approximately 1.25 times to about twice the steady state current significantly reduces degradation and blackening. Following the thermionic arc (i.e. run-up) phase, lamp current is reduced to its steady state operating current. To effect this current control, either the current, voltage or impedance can be monitored with the frequency adjusted accordingly. Correlation between current and voltage for a particular lamp type during the thermionic phase is determined by design or test such that the run-up phase voltage $V_R$ which produces $I_{OPT}$ can be predefined. A typical transfer function corresponding to the thermionic arc phase is shown in FIG. 2c. In operation, controller 4 adjusts the control signal 40 so as to adjust the operating frequency until the lamp voltage is equal to voltage $V_R$.

Often a broad range of voltages or currents is available within which optimal performance can be achieved while minimizing degradation and blackening. Under these conditions or when optimal performance is not required, a nominal resonant frequency $f_R$ can be defined with controller 4 programmed to adjust the operating frequency to this nominal frequency. Iterative frequncy adjustment in achieving optimal values for current or voltage is therefore not necessarily required in either the glow or arc phase.

Figure 3:
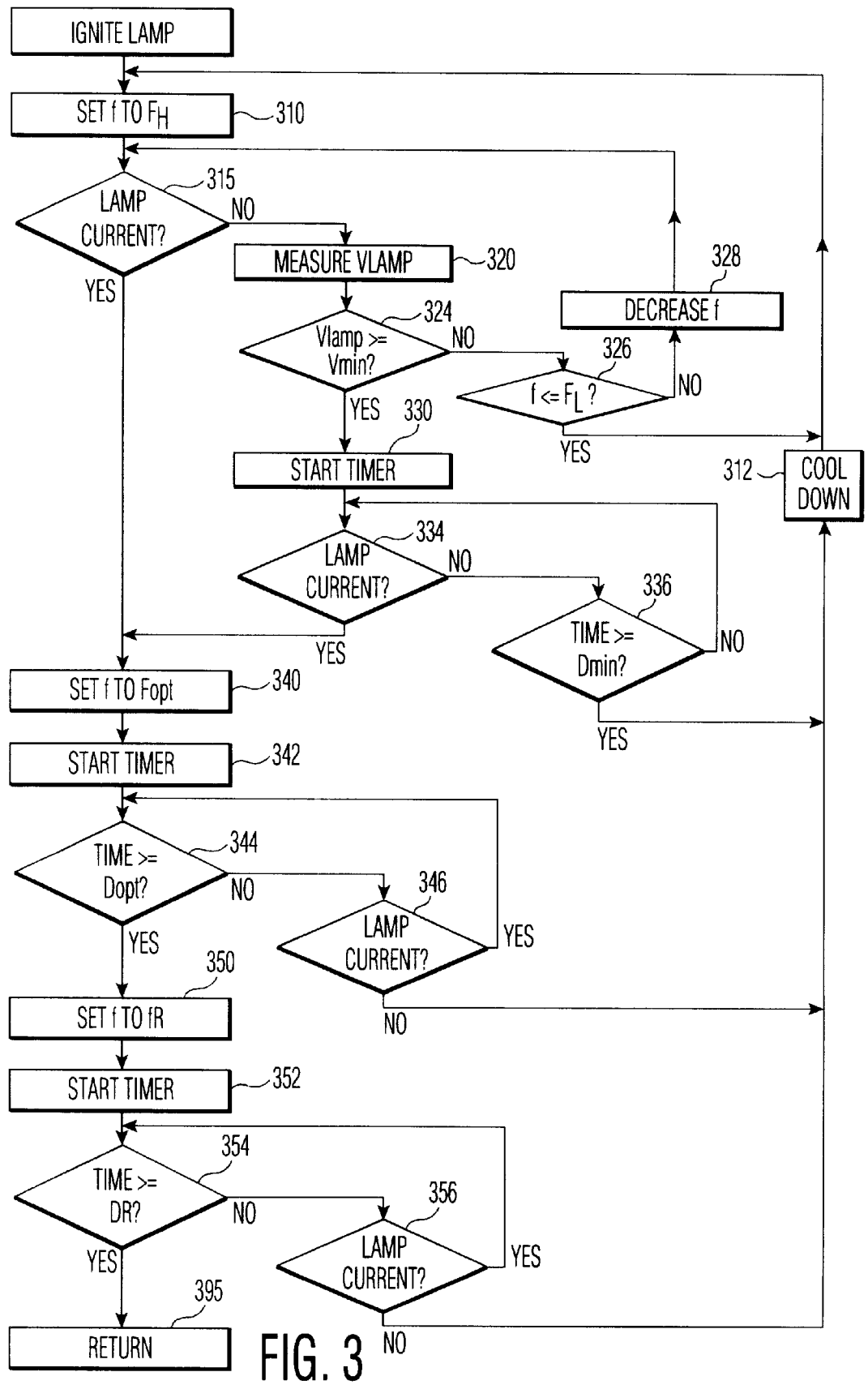
FIG. 3 is a flow chart illustrating the methodology employed in accordance with the invention.

FIG. 3 is a flowchart illustrating the method for controlling the starting of a lamp. To ignite lamp 9, the operating frequency f is set to $f_H$ at a step 310. The loop formed by a series of steps 320–328 decreases the frequency until the lamp voltage reaches voltage $V_{MIN}$. The lamp voltage is measured at step 320. At a step 328, the operating frequency is decreased provided that the lamp voltage has not yet reached voltage $V_{MIN}$ (as determined at a step 324) and the operating frequency is not at or below lower frequncy limit $f_L$ (as determined at a step 326). When the lower frequency limit has been reached, the frequency is reset to $f_H$ at step 310. Lamp current is monitored throughout this process including at a step 315. Once lamp 9 ignites, as determined at step 315, the process enters the glow phase through a step 340.

When the lamp voltage has reached voltage $V_{MIN}$ and lamp current is not yet flowing, a duration timer is started at a step 330. The process loops through a series of steps 334–336 until either lamp current flows as determined at step 334 or the minimum lamp ignition duration DMIN has elapsed as determined at step 336. When the minimum lamp ignition duration DMIN has elapsed, the process enters a cool down period at a step 312 and is then restarted at step 310. When at step 334 it is detemined that lamp current is flowing, the process enters the glow phase through step 340.

At step 340, the operating frequency is set to the nominal glow phase optimal frequency $f_{OPT}$. An iterative process can be employed, similar to the loop at steps 320–328 so as to adjust the frequency to achieve voltage $V_{OPT}$. In a preferred embodiment, the operating frequency is held at the nominal frequency $f_{OPT}$ for a duration DOPT via steps 344–346. Lamp current is monitored at step 346. When lamp 9 is extinguished, as indicated by the cessation of current, and following a cool down period at step 312 the process is restarted through step 310. After the duration DOPT elapses, the process enters the run-up phase through step 350.

At step 350, the operating frequency is set to the nominal run-up phase frequency $f_R$. An iterative process can be employed similar to the loop at steps 320–328 to adjust the frequency to achieve voltage $V_R$ or current $I_{OPT}$. In the preferred embodiment, the operating frequency is held at the nominal frequency $f_R$ for a duration DR through a series of steps 354–356. After the duration DR elapses, the process returns to a step 395 to enter the steady state mode of operation.

As can now be readily appreciated, through precise control by controller 4 of the exciter frequency throughout the three phases of ignition, a reduction can be had in lamp degradation and blackening. In particular, lower voltage and power ballast components can be employed. A reduction in the stress on these components is also achieved.

It will thus be seen that the objects set forth above and those made apparent from the preceding description are efficiently attained and, since certain changes can be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover of the generic and specific features of the invention herein described and all statements of the scope of the invention, which as a matter of language, might be said to fall therebetween. For example, controller 4 can comprise a voltage or current detector obviating the need for a discrete voltage comparator or current detector 5. Controller 4 can provide excitation signal 20 directly to resonant ignitor 3; and ignitor 3 can be made from voltage multipliers which need not utilize a resonant circuit in order to achieve high voltage signals for lamp ignition. Although the invention has been described in terms of high ignition voltage lamps, the principles embodied herein are not limited to lamps which require high ignition voltages.

We claim:

1. An electronic ballast for starting a high intensity discharge lamp having breakdown, non-thermionic glow and thermionic arc phases prior to entering a steady state operating mode, comprising:
    a resonant ignitor for applying a lamp voltage across the lamp;
    an exciter, responsive to a varying control signal, for exciting the resonant ignitor at a varying operating frequency; and
    a controller for producing the varying control signal based on the phase of the lamp;
    wherein prior to breakdown the controller adjusts the control signal so as to decrease the operating frequency so as to sweep toward a lamp voltage equal to a predetermined ignition voltage and wherein upon entering the glow phase the controller further adjusts the control signal so as to minimize the time duration within the glow phase and wherein upon entering the thermionic arc phase the controller further adjusts the control signal so as to increase lamp current.

2. The electronic ballast as claimed in claim 1, wherein the controller maintains the control signal at a preset operating frequency for a prefixed period of time during which the lamp voltage is held at the predetermined ignition voltage.

3. The electronic ballast as claimed in claim 1, wherein the controller maintains the control signal at a preset operating frequency for a prefixed period of time during the non-thermionic glow phase.

4. The electronic ballast as claimed in claim 1, wherein the controller maintains the control signal at a preset operating frequency for a prefixed period of time during the thermionic arc phase.

5. The electronic ballast as claimed in claim 2, wherein the controller maintains the control signal at a preset operating frequency for a prefixed period of time during the non-thermionic glow phase.

6. The electronic ballast as claimed in claim 2, wherein the controller maintains the control signal at a preset operating frequency for a prefixed period of time during the thermionic arc phase.

7. The electronic ballast as claimed in claim 5, wherein the controller maintains the control signal at a preset operating frequency for a prefixed period of time during the thermionic arc phase.

8. The electronic ballast as claimed in claim 1, wherein the operating frequency of the exciter is lower in the thermionic arc phase than in the non-thermionic glow phase.

9. A method of starting a high intensity discharge lamp having breakdown, non-thermionic glow and thermionic arc phases prior to entering a steady state operating mode by a ballast which includes a resonant ignitor for applying a lamp voltage across the lamp, an exciter, responsive to a varying control signal, for exciting the resonant ignitor at a varying operating frequency, and a controller for producing the varying control signal based on the phase of the lamp, comprising:
    decreasing the operating frequency of the exciter so as to sweep toward a lamp voltage equal to a predetermined ignition voltage;
    adjusting the control signal following breakdown so as to minimize the duration of the glow phase time; and
    further adjusting the control signal upon entering the thermionic arc phase so as to increase lamp current.

10. The method as claimed in claim 9, further including maintaining the control signal at a preset operating frequency for a prefixed period of time during which the lamp voltage is held at the predetermined ignition voltage.

11. The method as claimed in claim 9, further including maintaining the control signal at a preset operating frequency for a prefixed period of time during the non-thermionic glow phase.

12. The method as claimed in claim 9, further including maintaining the control signal at a preset operating frequency for a prefixed period of time during the thermionic arc phase.

13. The method as claimed in claim 9, further including lowering the operating frequency of the exciter when in the thermionic arc phase relative to the non-thermionic glow phase.

14. An apparatus for starting a discharge lamp having a breakdown phase, a non-thermionic glow phase and a thermionic arc phase, in that order, prior to entry into a steady state operating mode, comprising:
    a resonant ignitor for applying lamp voltage to the discharge lamp,
    means, responsive to a varying control signal, for generating an alternating voltage at a variable frequency for exciting the resonant ignitor at frequencies determined by the phase of the start-up mode of the discharge lamp, and
    a controller coupled to the voltage generating means for producing the varying control signal based on the phase of the lamp,
    wherein prior to breakdown the controller adjusts the control signal so as to decrease the operating frequency so as to sweep the lamp voltage toward a voltage equal to a predetermined ignition voltage, and wherein upon entering the glow phase the controller further adjusts the control signal so as to further adjust the operating frequency of the resonant ignitor to an optimal frequency $f_{opt}$ that will optimize the time duration within the glow phase, and wherein upon entering the thermionic arc phase the controller further adjusts the control signal so as to readjust the operating frequency of the resonant ignitor to a frequency that will increase lamp current to an optimal run-up current.

15. The discharge lamp starting apparatus of claim 14 further comprising means coupled to the discharge lamp and to the controller for detecting lamp voltage and lamp current, wherein the lamp current is continually monitored during the glow phase and the thermionic arc phase, and the controller is responsive to an output of the detecting means to adjust the control signal so as to readjust the resonant ignitor operating frequency so that it applies to the discharge lamp in the thermionic arc phase an operating voltage that produces in the lamp a run-up current in the range of approximately 1.25 to 2 times steady state lamp nominal operating current.

16. The discharge lamp starting apparatus of claim 14 wherein the controller, prior to breakdown, adjusts the control signal to derive an operating frequency above the resonant frequency of the resonant ignitor and further adjusts the control signal to sweep the operating frequency in the direction of the resonant frequency so as to sweep the resonant ignitor voltage upward until the predetermined ignition voltage is produced by the resonant ignitor at a given operating frequency, and the controller maintains the control signal at a value which maintains the given operating frequency for a given period of time during which the lamp voltage is held at the predetermined ignition voltage.

17. The discharge lamp starting apparatus of claim 14 wherein the controller, during the glow phase, adjusts the control signal so that the operating frequency increases to the optimal frequency $f_{opt}$ which is above said resonant frequency.

18. The discharge lamp starting apparatus of claim 14 wherein the controller, during the thermionic arc phase, adjusts the control signal so that the operating frequency is set to a frequency above the resonant frequency and for a prefixed period of time.

19. The method as claimed in claim 9 further comprising:

initially setting the operating frequency to a frequency $f_H >  f_0$, where $f_0$ is the resonant frequency of the resonant ignitor, detecting whether or not a lamp current is present, and if not, testing whether the lamp voltage is equal to or greater than the predetermined ignition voltage and, if not, decreasing the operating frequency of the exciter to continue to sweep toward a lamp voltage equal to the predetermined ignition voltage, if the lamp current detecting step indicates that lamp current is present, then setting the operating frequency to an optimal frequency $f_{opt}$ for the glow phase, starting a timing period, determining when the elapsed time is equal to or greater than an optimal time period $D_{opt}$ for the glow phase and then setting the operating frequency to a nominal run-up frequency $f_R$ for a time duration $D_R$ which is sufficient to prepare the lamp for its steady state mode of operation.

20. The method of starting a discharge lamp as claimed in claim 19 further comprising:

during said timing period, if the elapsed time is determined to be less than the optimal time period $D_{opt}$, testing whether lamp current is still present and, if not, allowing the discharge lamp to cool down and then, resetting the operating frequency to the frequency $f_h$ to thereby restart a new cycle of the method.

21. The electronic ballast as claimed in claim 1 wherein the controller, prior to breakdown, adjusts the control signal so as to sweep the operating frequency towards a preset operating frequency that will produce said predetermined ignition voltage and at a predetermined rate less than a step function.

* * * * *